United States Patent
Loew

[11] 4,123,222
[45] Oct. 31, 1978

[54] PROCESS FOR THE DYEING OR PRINTING OF POLYACRYLONITRILE MATERIAL

[75] Inventor: Peter Loew, Munchenstein, Switzerland

[73] Assignee: Ciba-Geigy Corporation, Ardsley, N.Y.

[21] Appl. No.: 778,655

[22] Filed: Mar. 16, 1977

[30] Foreign Application Priority Data

Mar. 23, 1976 [CH] Switzerland .................. 3606/76
Nov. 11, 1976 [CH] Switzerland .................. 14215/76

[51] Int. Cl.² .................... C09B 1/00; C07C 97/12
[52] U.S. Cl. .................... 8/39 A; 8/177 AB; 260/378; 260/396 R
[58] Field of Search .................... 8/39 A, 177 AB; 260/396 R, 378

[56] References Cited

U.S. PATENT DOCUMENTS 4,009,189  2/1977  Baserga .................... 8/39 A

FOREIGN PATENT DOCUMENTS 1,074,028  6/1967  United Kingdom.

Primary Examiner—A. Lionel Clingman
Attorney, Agent, or Firm—Edward McC. Roberts; Prabodh I. Almaula

[57] ABSTRACT

A process is described for the dyeing or printing of polyacrylonitrile materials, which process comprises the use of dyes of the formula

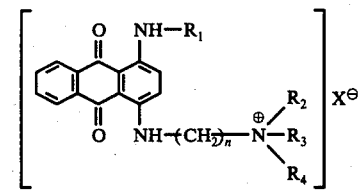

wherein $R_1$ represents a low-molecular, straight-chain alkyl group, $R_2$ and $R_3$ independently of one another each represent a low-molecular alkyl group, $R_4$ represents an aralkyl group, $n$ represents 2 or 3, and $X^\ominus$ represents an anion.

The dyeings obtained are distinguished by good build-up properties of the dyes, and the dyes are particularly suitable for trichromatic dyeings.

5 Claims, No Drawings

PROCESS FOR THE DYEING OR PRINTING OF POLYACRYLONITRILE MATERIAL

The present invention relates to a process for the dyeing or printing or polyacrylonitrile materials and also to the material dyed or printed by this process.

Anthraquinone dyes containing in the 4-position an aminoalkylene-trimethylammonium group are recommended in the French Patent Specification No. 1,158,839 for the dyeing of polyacrylonitrile materials. Such dyes have the disadvantage however that they are unsuitable for trichromatic dyeings. Furthermore, it is known from the French Patent Application Publication No. 2,086,050 that polyacrylonitrile materials can be dyed with anthraquinone dyes which carry in the 1-position an isopropylamino group. The dyes described in this French Patent Application Publication have however the disadvantage that they have poor build-up properties on polyacrylonitrile materials.

It has now been found that excellent dyeings are obtained on polyacrylonitrile materials by using dyes of the formula (1)

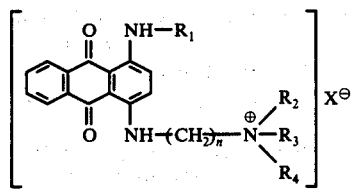

wherein $R_1$ represents a low-molecular, straight-chain alkyl group, $R_2$ and $R_3$ independently of one another each represent a low-molecular alkyl group, $R_4$ represents an aralkyl group, $n$ represents 2 or 3, and $X^\ominus$ represents an anion.

As a low-molecular straight-chain alkyl group, $R_1$ contains 1 to 4 carbon atoms; such groups are, for example, the methyl, ethyl, n-propyl and n-butyl groups.

Low-molecular alkyl groups represented by $R_2$ and $R_3$ can be straight-chain or branched-chain and they have 1 to 4 carbon atoms; these groups are, for example, the methyl, ethyl, n- and iso-propyl group and the n-, iso- and tert.-butyl group.

Aralkyl groups represented by $R_4$ are, for example, the benzyl and phenylethyl groups, with these groups being able to carry on the phenyl rings further nonionic substituents, such as halogen, e.g. chlorine and bromine, also lower alkyl such as methyl and ethyl, or lower alkoxy groups such as the methoxy group.

The anion represented by $X^\ominus$ can be one customary in cationic dyes, especially a halide, such as the chloride or bromide.

In preferred dyes of the formula (1), $R_1$, $R_2$ and $R_3$ independently of one another represent the methyl or ethyl group, $R_4$ represents benzyl, and $n$ represents 3.

These dyes are known from DOS No. 2,343,561 and also from the Swiss Patent Application No. 3607/76, and can be produced by the usual methods, e.g. by quaternisation of a compound of the formula (2)

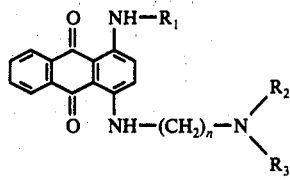

with a quaternising agent of the formula $R_4X$, wherein $R_1$ $R_2$, $R_3$, $R_4$ and $n$ have the given meanings, and X represents in particular a halogen atom, such as chlorine or bromine.

These dyes can be dyed or printed from an aqueous bath onto polyacrylonitrile materials, e.g. from an aqueous acid dye bath of which the ph value has been brought to about 4 to 5 with acetic acid.

Dyeings distinguished by good build-up properties of the dye are obtained. Furthermore, the dyes usable according to the invention are particularly suitable for trichromatic dyeings, since these dyes can be very well combined with other dyes.

By polyacrylonitrile material are meant, in particular, polymers containing 85 to 100% of acrylonitrile. They contain in addition, e.g., 0 to 15% of vinyl acetate, vinyl pyridine, vinyl chloride, vinylidene chloride, acrylic acid, acrylic acid ester, methacrylic acid or methacrylic acid ester. The polyacrylonitrile material can be in the most varied stages of processing; for example it can be in the form of flock, carded sliver, wet cable, cable, continuous material, yarn, twine, high-bulk yarn, fabrics or knitwear.

In the following Examples, parts are given as parts by weight, percentages as percent by weight, and temperatures in degrees Centigrade.

EXAMPLE 1 a. Production of the dyes 48.8 parts of benzyl chloride are added to 118 parts of 1-dimethylamino-3-(1'-methylamino-4'-anthraquinylamino)-propane in 340 parts of chlorobenzene at 100°. After being stirred for 3 hours at 110°, the mixture is cooled, filtered and washed with warm chlorobenzene. After drying, there remain 133 parts of 3-(1'-methylamino-4'-anthraquinylamino)-N,N-dimethyl-N-benzylpropylammonium chloride.

The blue dyes of formula (1) listed in the following Table are obtained by using, instead of 1-dimethylamino-3-(1'-methylamino-4'-anthraquinylamino)-propane, equimolar amounts of an anthraquinone compound of the formula (2) and, instead of benzyl chloride, equimolar amounts of a quaternising agent of the formula $R_4X$, with the procedure otherwise being the same as before.

Table

| | Dye of the formula (1) | | | | |
|---|---|---|---|---|---|
| | Anthraquinone compound of the formula (2) | | | Quaternizing agent $R_4X$ | |
| Ex. | $R_1$ | n | $R_2$ | $R_3$ | $R_4$ | X |
| 2 | $C_2H_5$ | 3 | $CH_3$ | $CH_3$ | $CH_2C_6H_5$ | Cl |
| 3 | $C_2H_5$ | 3 | $CH_3$ | $CH_3$ | $CH_2C_6H_5$ | Br |
| 4 | $C_2H_5$ | 2 | $CH_3$ | $CH_3$ | $CH_2C_6H_5$ | Cl |
| 5 | $CH_3$ | 2 | $CH_3$ | $CH_3$ | $CH_2CH_2C_6H_5$ | Cl |
| 6 | $CH_3$ | 2 | $C_2H_5$ | $C_2H_5$ | $CH_2C_6H_5$ | Cl |
| 7 | $CH_3$ | 3 | $C_2H_5$ | $C_2H_5$ | $CH_2C_6H_5$ | Cl |
| 8 | n-$C_3H_7$ | 3 | $CH_3$ | $CH_3$ | $CH_2C_6H_5$ | Cl |
| 9 | n-$C_3H_7$ | 3 | $CH_3$ | $CH_3$ | $CH_2C_6H_5$ | Br |
| 10 | $CH_3$ | 3 | $CH_3$ | $CH_3$ | $CH_2C_6H_4CH_3$ | Cl |
| 11 | $CH_3$ | 3 | $CH_3$ | $CH_3$ | $CH_2C_6H_4Cl$ | Cl |
| 12 | $C_2H_5$ | 3 | $CH_3$ | $CH_3$ | $CH_2C_6H_4Cl$ | Cl |
| 13 | n-$C_4H_9$ | 3 | $CH_3$ | $CH_3$ | $CH_2C_6H_5$ | Cl |

Table -continued

| | Dye of the formula (1) | | | | |
|---|---|---|---|---|---|
| | Anthraquinone compound of the formula (2) | | | Quaternizing agent $R_4X$ | |
| Ex. | $R_1$ | n | $R_2$ | $R_3$ | $R_4$ | X |
| 14 | $CH_3$ | 3 | $CH_3$ | $CH_3$ | $CH_2C_6H_5$ | Br | b. Dyeing instructions 1 part of one of the dyes obtained by the procedure described in the foregoing is dissolved in 2000 parts of water with the addition of 4 parts of 40% acetic acid, 1 part of crystallised sodium acetate and 10 parts of anhydrous sodium sulphate. Into this dye bath at 60° are introduced 100 parts of dried yarn made from polyacrylonitrile staple fibres; the temperature is raised within half an hour ot 100° and dyeing is performed for one hour at boiling temperature. The dyeing is then well rinsed and dried.

A level blue dyeing having excellent properties is obtained.

EXAMPLE 15

A printing paste is prepared consisting of:
25 parts of a dye obtained according to Examples 1 to 14,
30 parts of thiodiglycol,
20 parts of acetic acid (80%),
350 parts of boiling water,
500 parts of locust bean flour thickening,
30 parts of tartaric acid (1:1),
15 parts of di-(β-cyanoethyl)-formamide, and
30 parts of a naphthalenesulphonic acid/formaldehyde condensation product.

A polyacrylonitrile fabric printed with this printing paste is subsequently fixed on an HT suspension loop steamer for 20 to 30 minutes at 101° to 103°, and finished in the customary manner.

A blue printing is obtained.

EXAMPLE 16

A polyacrylonitrile mixed polymer, consisting of 93% of acrylonitrile and 7% of vinyl acetate, is dissolved in dimethylacetamide to the extent of 15%. The spinning solution is extruded in a spinning bath consisting of 40% of dimethylacetamide and 60% of water. The resulting tow is subsequently stretched by known methods and then freed from dimethylacetamide by rinsing with hot and cold water.

This wet tow is dyed by immersion in an aqueous bath at 42° having the following composition:
9 g of one of the dyes obtained according to Examples 1 to 14 per liter,
adjusted to pH 4.5 with acetic acid. The time that the tow is in contact with the dye liquor is 2 seconds. The excess dye liquor is then squeezed out and the tow is fed to the dryer. A tow dyed deep blue and having good properties is obtained.

I claim:

1. Process for the dyeing or printing of polyacrylonitrile materials, which process comprises the use of dyes of the formula (1)

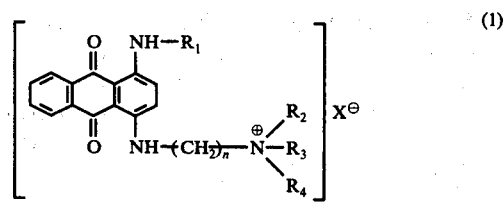

wherein $R_1$ represents a low-molecular, straight-chain alkyl group, $R_2$ and $R_3$ independently of one another each represent a low-molecular alkyl group, $R_4$ represents an aralkyl group, $n$ represents 2 or 3, and $X^\ominus$ represents an anion.

2. Process according to claim 1, which process comprises the use of a dye of the formula (1) wherein $R_1$, $R_2$ and $R_3$ independently of one another represent the methyl or ethyl group.

3. Process according to claim 1, which process comprises the use of a dye of the formula (1) wherein $R_4$ represents the benzyl group.

4. Process according to claim 1, wherein $n$ represents 3.

5. The polyacrylonitrile material dyed or printed by the process according to claim 1.

* * * * *